United States Patent [19]

Hayashi

[11] 4,057,848

[45] Nov. 8, 1977

[54] ADDRESS TRANSLATION SYSTEM

[75] Inventor: Kenji Hayashi, Hadano, Japan

[73] Assignee: Hitachi, Ltd., Japan

[21] Appl. No.: 584,829

[22] Filed: June 9, 1975

[30] Foreign Application Priority Data

June 13, 1974 Japan .................. 49-67355

[51] Int. Cl.² .............................................. G06F 7/04
[52] U.S. Cl. .................................................. 364/200
[58] Field of Search ....................... 340/172.5; 445/1

[56] References Cited

U.S. PATENT DOCUMENTS

| | | | |
|---|---|---|---|
| 3,723,976 | 3/1973 | Alvarez et al. | 340/172.5 |
| 3,761,881 | 9/1973 | Anderson et al. | 340/172.5 |
| 3,764,996 | 10/1973 | Ross | 340/172.5 |
| 3,778,776 | 12/1973 | Hakozaki | 340/172.5 |
| 3,781,808 | 12/1973 | Ahearn et al. | 340/172.5 |
| 3,829,840 | 8/1974 | Burk et al. | 340/172.5 |
| 3,839,706 | 10/1974 | Borchsenius | 340/172.5 |
| 3,854,126 | 12/1974 | Gray et al. | 340/172.5 |
| 3,902,164 | 8/1975 | Kelley et al. | 340/172.5 |
| 3,909,798 | 9/1975 | Wallach et al. | 340/172.5 |

Primary Examiner—Charles E. Atkinson
Assistant Examiner—Errol A. Krass
Attorney, Agent, or Firm—Craig & Antonelli

[57] ABSTRACT

In an electronic computer employing virtual storage system, the mapping of plural logical spaces — logical addressing capability — onto larger real space is made possible so that a conventional program can be applied to a computer system furnished with a main memory having a great capacity.

7 Claims, 4 Drawing Figures

ADDRESS TRANSLATION SYSTEM

BACKGROUND OF THE INVENTION

1. Field of the Invention

The present invention relates to a data processing apparatus employing virtual storage system, and more particularly to an address translation system in which the real address is longer than the logical address.

2. Description of the Prior Art

In general, a large-capacity data processing apparatus adopts a virtual storage system. Namely, users' programs or data are stored in the continuous regions on a virtual memory and a main memory is independently supervised, whereby logically continuous addresses are relocated at arbitrary addresses in the main memory so as to effectively utilize the main memory. In this case, logical addresses are alloted to the programs and data stored in the virtual memory while real addresses obtained through translation by an address translation mechanism are used for the addressing of the main memory.

The address translation mechanism of the virtual storage system is used to support the virtual memory, that is, to make it possible to process programs and data too large for the capacity of the main memory in accordance with instructions.

The recent progress of the hardware techniques of memories has produced a small-sized, very large capacity memory which could not be even expected in the past. In the meanwhile, the development of programs which are the essence of software was rapidly carried out until the package of the available programs became enormous. However, the address space, i.e., logical address spaces, for the programs are restricted by the established architecture so that it requires a considerable amount of money and labor to change the already arranged architecture. Therefore, when in correspondence with the advance of software techniques, it is intended to adopt a memory device of such a large capacity as not being covered by the conventional architecture, the adoption must be effected in a manner capable of ensuring the use of the conventional programs.

SUMMARY OF THE INVENTION

One object of the present invention is to provide a data processing system having real space larger than logical space.

Another object of the present invention is to provide an address translation system which maps a plurality of logical spaces assuming the already established architecture onto a real space.

Yet another object of the present invention is to provide an address translation system which translates a logical address into a real address consisting of bits whose number is greater than that of the bits constituting the logical address.

The address translation system according to the present invention is provided with a translation lookaside buffer (referred to as TLB) which has at least one memory location. The memory location of the TLB stores a translation pair of a logical address and the corresponding real address consisting of bits whose number is larger than that of the bits constituting the logical address. Any desired logical address is translated, when delivered, into the real address belonging to the translation pair which contains the same logical address as the desired one. The number of the bits of the translated real address is larger than that of the bits of the original logical address so that a plurality of logical spaces can be mapped onto a real space. Thus, there is obtained a computer system which can meet the demand for the increase in real space (main memory capacity) without changing the already established architecture of programs, that is, with the exchangeability of the conventional programs preserved.

DESCRIPTION OF THE PREFERRED EMBODIMENTS

Figure 1:
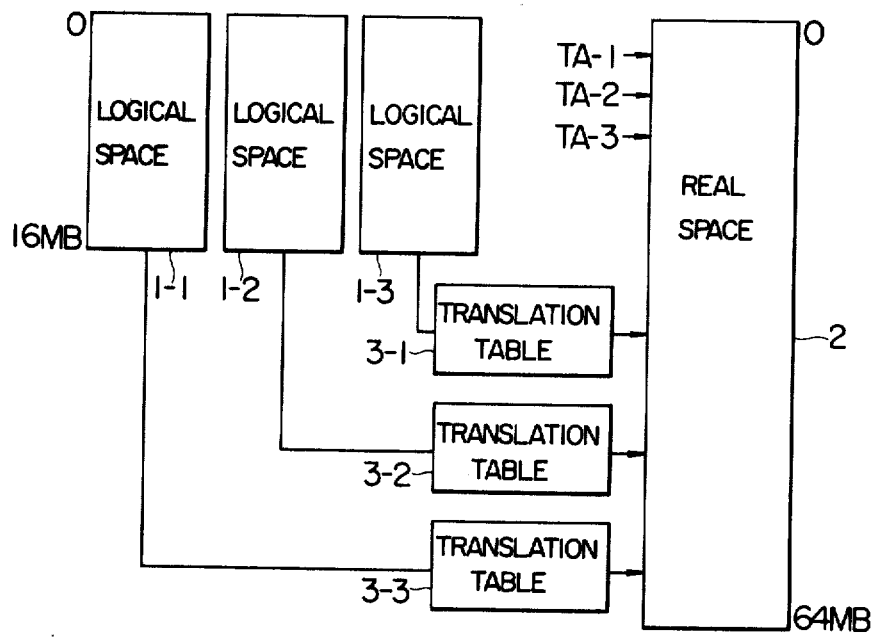
FIG. 1 shows in block diagram the principle of the present invention.

FIG. 1 corresponds to the case where logical spaces 1-1, 1-2 and 1-3, each having 16MB, are mapped onto a real space (main memory) 2 having 64MB. The logical spaces 1-1, 1-2 and 1-3 are provided respectively with translation tables 3-1, 3-2 and 3-3 and the logical addresses, each consisting of 24 bits and used for the addressing of the logical spaces 1-1, 1-2 and 1-3, are translated through the translation tables 3-1, 3-2 and 3-3 into the real addresses each of which consists of 26 bits, so as to make the logical spaces correspond to the real space. TA-1, TA-2 and TA-3 designate the starting addresses on the real space 2, corresponding to the translation tables 3-1, 3-2 and 3-3.

Figure 2:
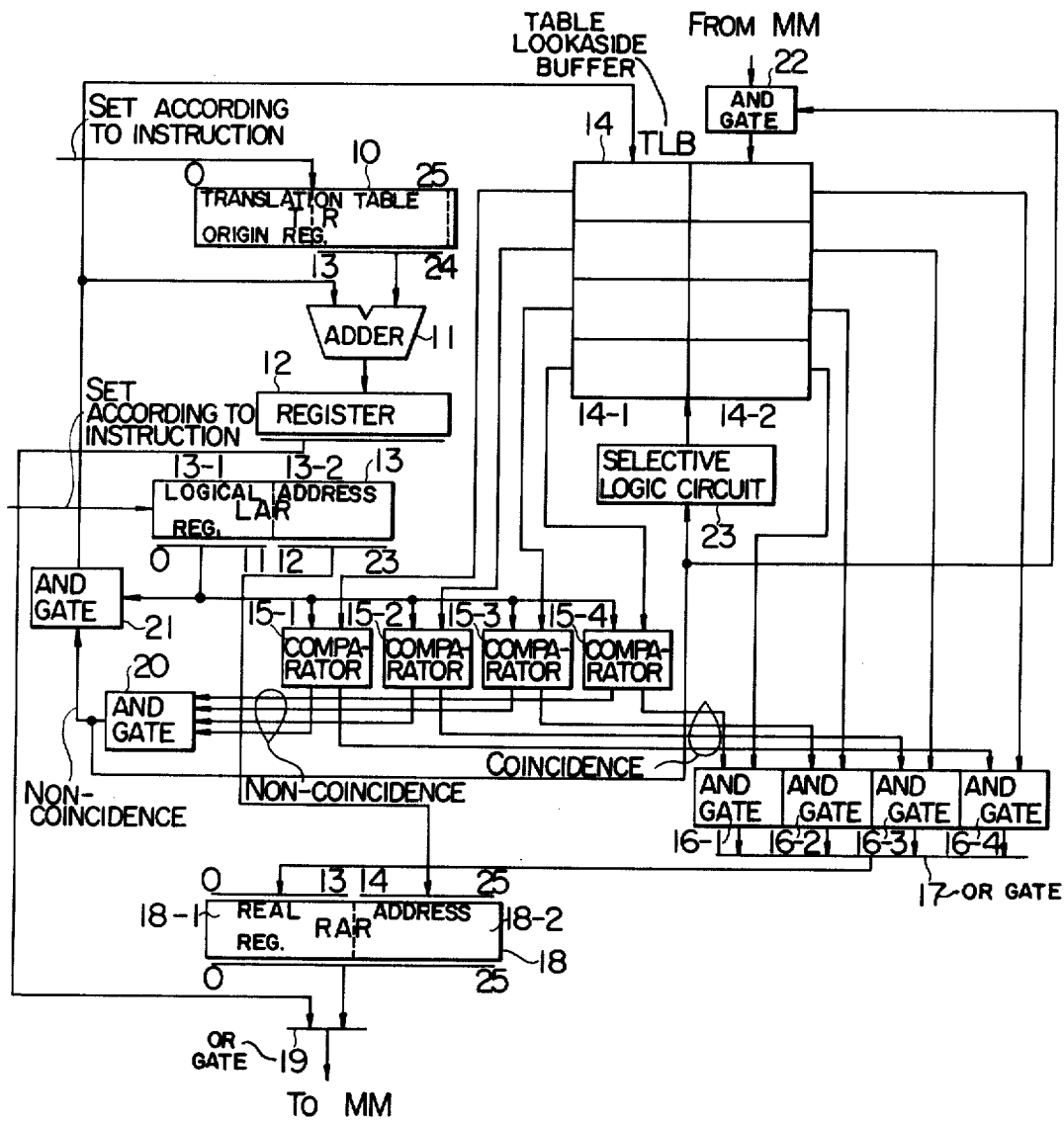
FIG. 2 is a block diagram of an address translation system as one embodiment of the present invention.

FIG. 2 shows an embodiment of an address translation mechanism. For convenience sake the following assumption will be introduced in the translation of logical address into real one: the upper address portion, i.e., upper 12 bits, of a logical address consisting of 24 bits is translated into an address portion consisting of 14 bits, to serve as the upper address portion, i.e., upper 14 bits, of a real address consisting of 26 bits while the remaining address portion, i.e., lower 12 bits, of the logical address is used intact as the lower address portion of the real address. However, it should be noted that the way of translation of addresses according to the present invention is by no means limited to what is described just above. For example, a 24-bit logical address may be entirely translated into a 26-bit real address.

A logical address according to an instruction is set in a logical address register LAR 13 and the main memory (not shown) is referred to with respect to the content of the LAR 13. The 12-bit upper address portion of the logical address, which for example specifies a desired region, is set in the left half part 13-1 of the LAR 13 while the 12-bit lower address portion of the logical address, which for example represents a relative position in the desired region, is stored in the right half part 13-2 of the LAR 13. It will cause a degradation in efficiency if the translation table in the main memory is referred to each time, and therefore a TLB 14 is provided which stores logical-real address translation pairs having highest frequency of use. The logical and real address storing parts 14-1 and 14-2 of the TLB 14 respectively store the upper 12 bits of the logical address and the upper 14 bits of a corresponding real address. Comparison circuits 15-1 to 15-4 are provided for the logical-real address translation pairs. Upon instruction of reference to the memory, the upper address portion of the LAR 13 is compared with the respective contents of the logical address storing parts 14-1 of the TLB 14 by means of the comparison circuits 15-1 to 15-4. AND gates 16-1 to 16-4 are also provided for the translation pairs of the TLB 14. When one of the comparison circuits detects a coincidence signal, the AND gate corresponding to the comparison circuit is opened so that the content of the real address storing part 14-2 of the corresponding translation pair is read out and set in the upper 14-bit position 18-1 of a real address register RAR 13, for storing upper address portion, through an OR gate 17. The lower 12-bit address portion of the LAR 13 is directly set in the lower 12-bit position 18-2 of the RAR 18. The thus constructed 26-bit real address is passed through an OR gate 19 and used for accessing the main memory.

On the other hand, when none of the comparison circuits 15-1 to 15-4 detects a coincidence signal, an AND gate 20 delivers a non-coincidence signal to open an AND gate 21 so that the upper address portion of the LAR 13 is led to one of the inputs of an adder 11. The lower 12-bit content, except the lowermost one bit, of a translation table origin register, i.e., table register TR 10, is led to the other input of the adder 11. The adder 11 makes the sum of the input quantities. The resultant address, i.e., translation table address, is set in a register 12. In this case, the upper 13 bits of the content of the TR 10, which content is set according to instruction, are neglected and the lowermost bit of the content is used to exhibit the validity of the TR 10. The translation table address stored in the register 12 is sent through the OR gate 19 to the main memory so that the content of the corresponding translation table is read out.

Figure 4:
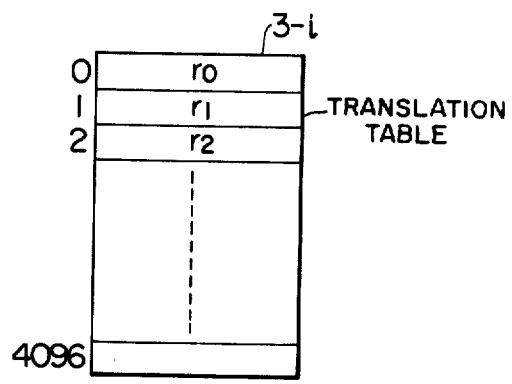
FIG. 4 shows a translation table used in the present invention.

FIG. 4 shows a single-stage translation table. The table has many memory locations storing real addresses indicated by $r_0, r_1, r_2, \ldots$ In the case where two or more stages of translation tables are used, a translation table of one stage stores the address of the translation table of the next stage and the translation table of the last stage stores real addresses as shown in FIG. 4.

The content of the translation table read out of the main memory is sent through an AND gate 22 opened by the non-coincidence signal from the AND gate 20 and stored in the real address storing part 14-2 of the TLB 14 and at the same time the corresponding upper address portion of the LAR 13 is stored in the logical address storing part 14-1 of the TLG 14 through the AND gate 21. A selective logic circuit 23 responds to the non-coincidence signal from the AND gate 20 to supply for the TLB 14 the addresses in which the above-mentioned translation pairs are stored. The selective logic circuit 23 is used only when new translation pairs are stored in the TLB 14. The selective logic circuit 23 may be so designed, by employing one of the known suitable methods, as to supply addresses based on the desired factors such as random, novelty, operation mode, usage, etc.

Thereafter, a coincidence between the upper address portion of the LAR 13 and the content of the logical address storing part 14-1 of the TLB 14 is searched as before and when such a coincidence is detected (it is a matter of fact that a certain coincidence must be surely detected), the real address corresponding to the detected logical address is stored in the upper 14-bit position 18-1 of the real address register RAR 18. At the same time, as described before, the lower address portion of the LAR 13 is set in the lower 12-bit position 18-2 of the RAR 18.

The address translation mechanism shown in FIG. 2 is fundamentally the same as the conventional one, but one of the most notable features of the present address translation mechanism is the translation of a logical address presented by instruction into a real address which is longer than the logical address.

Figure 3:
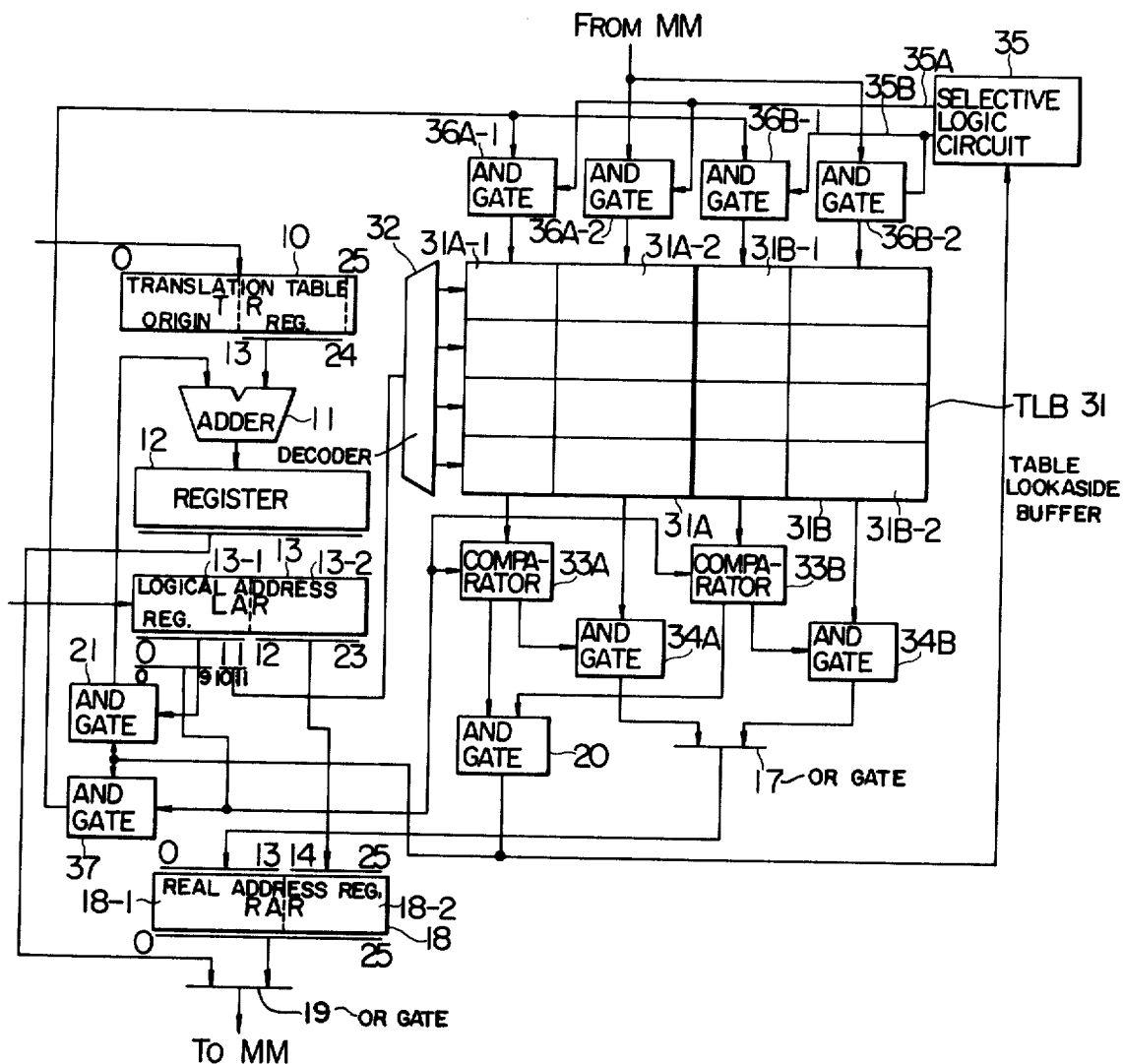
FIG. 3 is a block diagram of an address translation system as another embodiment of the present invention.

FIG. 3 shows an address translation system as another embodiment of the present invention. In FIG. 3 the same reference numerals or letters are applied to like parts or elements as in FIG. 2.

A TLB 13 has four memory locations, each of which consists of two logical-real address translation pairs 31A and 31B. This structure is, however, only presented by way of example and the memory location may have only one translation pair or more than two. Logical addresses are stored in logical address storing parts 31A-1 and 31B-1 while the real addresses corresponding to the logical addresses are set in real address storing parts 31A-2 and 31B-2.

The two lowermost bits of the upper address portion 13-1 in the LAR 13 is sent to an address decoder 32 to address one of the four memory locations of the TLB 31. The two bits to be sent to the address decoder 32 are not limited to the two lowermost bits of the upper address portion 13-1, but any two bits within the upper address portion 13-1 may be selected for the same purpose. Moreover, the number of the bits to be selected need not be two, but $n$ bits can be selected and in such a case the TLB 31 must have $2^n$ memory locations. In each of the logical address storing parts 31A-1 and 31B-1 is stored a primary portion, i.e., upper address portion minus the bits, i.e., a secondary portion, sent to the address decoder 32. The primary portion consists of ten bits in this case. The 14-bit upper address portion of the real address is stored in each of the real address storing parts 31A-2 and 31B-2.

The primary portions of the two logical addresses read out of the memory locations according to the instruction by the address decoder 32, are led to comparison circuits 33A and 33B to be compared with the primary portion in the LAR 13. AND gates 34A and 34B are provided corresponding to the comparison circuits 33A and 33B. If one of the comparison circuits delivers a coincidence signal, the corresponding AND gate is opened so that the real address of the associated translation pair is read out. The real address thus read out is sent through the OR gate 17 and set in the upper 14-bit position 18-1 of the RAR 18 for storing the upper address portion of the real address. The 12-bit lower address portion in LAR 13 is set, as it is, in the lower bit position 18-2 of the RAR 18.

On the other hand, if none of the comparison circuits 33A and 33B delivers a coincidence signal, the AND gate 20 sends out a non-coincidence signal to open the AND gate 21. Consequently, the address of the translation table is set in the register 12 as described before with FIG. 2 and further fed to the main memory.

The non-coincidence signal from the AND gate 20 is fed to a selective logical circuit 35, which delivers, as described before with FIG. 2 a signal onto one of lines 35A and 35B to open one of the pairs of AND gates 36A-1 and 36A-2, and 36B-1 and 36B-2. In this way, the content read out of the main memory, i.e., upper address portion of the real address, and the primary portion of the logical address sent through the AND gate 37 are stored as a translation pair in one of the memory locations selected by the address decoder 32.

I claim:

1. An address translation system for mapping a plurality of logical spaces onto a real space, comprising
    a logical address register in which a logical address is set;
    a table lookaside buffer for storing translation pairs each including said logical address and a corresponding real address to translate said logical address set in said logical address register into said real address whose bit number is larger than that of said logical address;
    a searching means for judging whether said table lookaside buffer contains the same logical address as that set in said logical address register or not;
    an output means for outputting the real address of the translation pair corresponding to said logical address when said logical address is contained in said table lookaside buffer; and
    a real address register in which the real address from said output means is set.

2. An address translation system as claimed in claim 1, further comprising
    a main memory having a translation table for translating logical addresses into real addresses;
    a translation table origin register for storing the starting address of said translation table;
    an adder for summing the contents of both said logical address register and said translation table origin register, in response to a non-existence signal from said searching means which indicates that said logical address contained in said table lookaside buffer is different from that set in said logical address register;
    a means for supplying to said main memory the output of said adder as the address of said translation table; and
    a means for storing translation pairs in said table lookaside buffer in response to the non-existence signal from said searching means, each of said translation pairs including the logical address in said logical address register and the real address obtained from said translation table in said main memory.

3. An address translation system for mapping a plurality of logical spaces onto a real space, comprising
    a logical address register in which a logical address including an upper portion to specify a desired region and a lower address portion to represent a relative position in said region, is set;
    a table lookaside buffer to store translation pairs, each including said upper address portion of said logical address and the upper address portion of a real address which corresponds to said upper address portion of said logical address and whose bit number is larger than that of said upper address portion of said logical address;
    a searching means for judging whether said table lookaside buffer contains the same upper address portion as said upper address portion in said logical address register or not;
    an output means for outputting the upper address portion of the real address of the translation pair corresponding to said upper address portion of said logical address when said upper address portion of said logical address is contained in said table lookaside buffer; and
    a real address register in which said upper address portion of said real address from said output means and the lower address portion from said logical address register are set.

4. An address translation system as claimed in claim 1, wherein said searching means includes a plurality of comparison means, said comparison means being provided in correspondence with the number of said translation pairs of said table lookaside buffer so as to compare the logical address from said logical address register with the logical addresses stored in said table lookaside buffer, and said output means outputs to said real register the real address belonging to the translation pair for which the comparison means associated therewith delivers a coincidence signal.

5. An address translation system as claimed in claim 3, wherein said searching means includes a plurality of comparison means, said comparison means being provided in correspondence with the number of said translation pairs of said table lookaside buffer so as to compare an upper address portion of the logical address from said logical address register with an upper address portion of the logical address stored in said table lookaside buffer, and said output means outputs to said real register an upper address portion of the real address belonging to the translation pair for which the comparison means associated therewith delivers a coincidence signal.

6. An address translation system for mapping a plurality of logical spaces onto a real space, comprising
    a logical address register in which a logical address is set;
    a table lookaside buffer having a plurality of memory locations, each storing at least one translation pair including a first portion having at least one arbitrary bit of said logical address, and a real address corresponding to said logical address, the number of bits of said real address being greater than that of said logical address;
    an addressing means for reading a desired translation pair out of the memory location of said table lookaside buffer, specified by a second portion which is the content of said logical address register other than said first portion;
    comparison means for comparing the first portion of the logical address read out of said table lookaside buffer with the first portion from said logical address register;
    a real address register; and
    an output means for outputting to said real address register a real address corresponding to the address for comparison means outputs a coincidence signal.

7. An address translation system for mapping a plurality of logical spaces onto a real space, comprising
    a logical address register in which a logical address consisting of an upper address portion to specify a desired region and a lower address portion to represent a relative position in said region, is set;
    a table lookaside buffer having a plurality of memory locations, each storing at least one translation pair including a first portion having at least one arbitrary bit of the upper address portion of said logical address and, an upper address portion of a real address corresponding to said upper address portion of said logical address, the number of bits of said real address being greater than that of said logical address;

an addressing means for reading a desired translation pair out of the memory location of said table lookaside buffer, specified by a second portion which is the content of said upper portion of said logical address register other than said first portion;

comparison means for comparing the first portion of the logical address read out of said table lookaside buffer with the first portion from said logical address register;

an output means for outputting the upper address portion of the real address corresponding to the address for which the comparison means outputs a coincidence signal; and a real address register in which the upper address portion of the real address from said output means and the lower address portion from said logical address register, are set.

* * * * *